United States Patent
Sekiguchi et al.

(10) Patent No.: US 8,089,582 B2
(45) Date of Patent: Jan. 3, 2012

(54) LIQUID CRYSTAL DISPLAY DEVICE COMPRISING AT LEAST ONE GROOVE HAVING AN END PORTION THAT STOPS SHORT OF THE NON-ADJACENT OPPOSITE SIDE SURFACES AND EXTENDS IN A DIRECTION PERPENDICULAR TO THE NON-ADJACENT SIDE SURFACES

(75) Inventors: Yoshifumi Sekiguchi, Hitachiota (JP); Akitoyo Konno, Hitachi (JP); Hiroshi Sasaki, Mito (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 201 days.

(21) Appl. No.: 12/129,838

(22) Filed: May 30, 2008

(65) Prior Publication Data

US 2008/0297695 A1    Dec. 4, 2008

(30) Foreign Application Priority Data

May 31, 2007  (JP) ................................. 2007-144728
Sep. 14, 2007  (JP) ................................. 2007-238661

(51) Int. Cl.
*G02F 1/1335* (2006.01)
*F21V 7/04* (2006.01)

(52) U.S. Cl. ............................ 349/65; 362/616; 362/617

(58) Field of Classification Search .......... 362/616–620; 345/62, 65
See application file for complete search history.

(56) References Cited

U.S. PATENT DOCUMENTS

| | | | |
|---|---|---|---|
| 6,568,819 B1 | 5/2003 | Yamazaki et al. | |
| 2002/0101551 A1* | 8/2002 | Akaoka | 349/65 |
| 2003/0030764 A1* | 2/2003 | Lee | 349/65 |
| 2004/0124764 A1 | 7/2004 | Suzuki et al. | |
| 2004/0264911 A1* | 12/2004 | Toeda et al. | 385/146 |
| 2005/0231106 A1 | 10/2005 | Tanaka et al. | |
| 2006/0070280 A1* | 4/2006 | Yamamura et al. | 40/564 |
| 2006/0176416 A1* | 8/2006 | Ikeda | 349/58 |
| 2006/0215074 A1* | 9/2006 | Jak et al. | 349/65 |
| 2006/0256581 A1* | 11/2006 | Hwang et al. | 362/619 |
| 2006/0290627 A1 | 12/2006 | Konno et al. | |
| 2007/0109779 A1 | 5/2007 | Sekiguchi et al. | |
| 2007/0153548 A1 | 7/2007 | Hamada et al. | |

(Continued)

FOREIGN PATENT DOCUMENTS

JP    8-152526    6/1996

(Continued)

*Primary Examiner* — Mark Robinson
*Assistant Examiner* — Dennis Y Kim
(74) *Attorney, Agent, or Firm* — Antonelli, Terry, Stout & Kraus, LLP.

(57) ABSTRACT

An object of the present invention is to provide a liquid crystal display device having a light guide plate that is capable of providing improved liquid crystal display performance without generating a striped image. The liquid crystal display device includes a light guide plate, which illuminates a liquid crystal panel from its rear surface, and light sources, which shed a light ray on the light guide plate. The rear surface of the light guide plate is separated into a plurality of rear surface divisions by concave grooves. The light sources can adjust the brightness of each rear surface division. The display performance of the liquid crystal panel is improved by individually managing a plurality of regions of the liquid crystal panel, which correspond to the rear surface divisions, and darkening a rear surface division that corresponds to a region where the black color is predominant.

18 Claims, 12 Drawing Sheets

U.S. PATENT DOCUMENTS

| | | |
|---|---|---|
| 2007/0188677 A1* | 8/2007 | Souk et al. .................. 349/65 |
| 2008/0002098 A1 | 1/2008 | Imajo et al. |
| 2008/0030650 A1 | 2/2008 | Kitagawa et al. |

FOREIGN PATENT DOCUMENTS

| | | |
|---|---|---|
| JP | 2000-56137 | 2/2000 |
| JP | 2001-92370 | 4/2001 |
| JP | 2001-210122 | 8/2001 |
| JP | 2004-146268 | 5/2004 |
| JP | 2005-77688 | 3/2005 |
| JP | 2005-302336 | 10/2005 |
| JP | 2006-134748 | 5/2006 |
| JP | 2006-156324 | 6/2006 |
| JP | 2007-3805 | 1/2007 |
| JP | 2007-12417 | 1/2007 |
| JP | 2007-73206 | 3/2007 |
| JP | 2007-157686 | 6/2007 |
| JP | 2008-14984 | 1/2008 |
| JP | 2008-34372 | 2/2008 |
| JP | 2008-165101 | 7/2008 |
| WO | WO 2005071976 A1 * | 8/2005 |

* cited by examiner

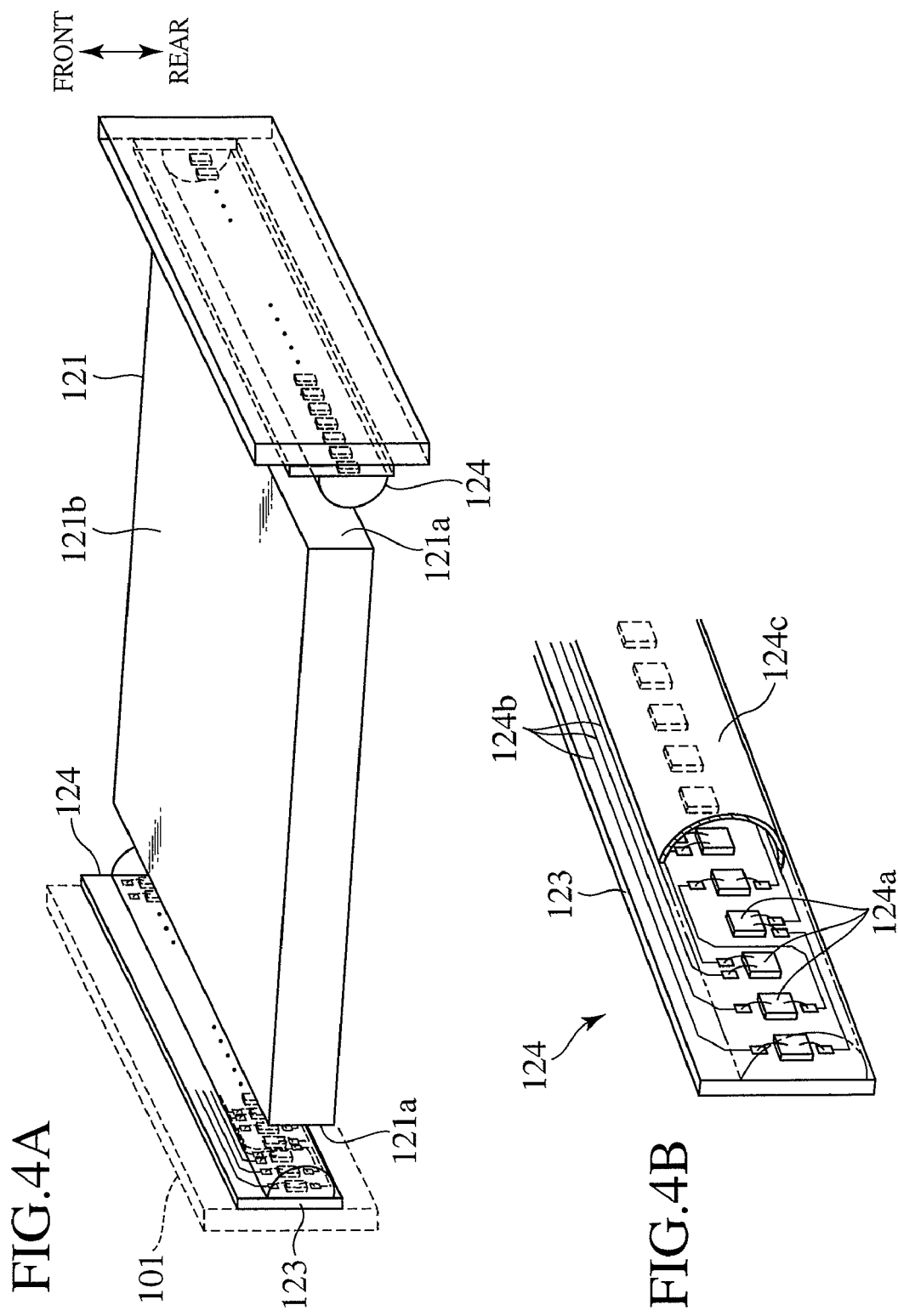

FIG.9
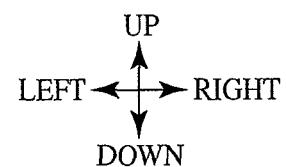
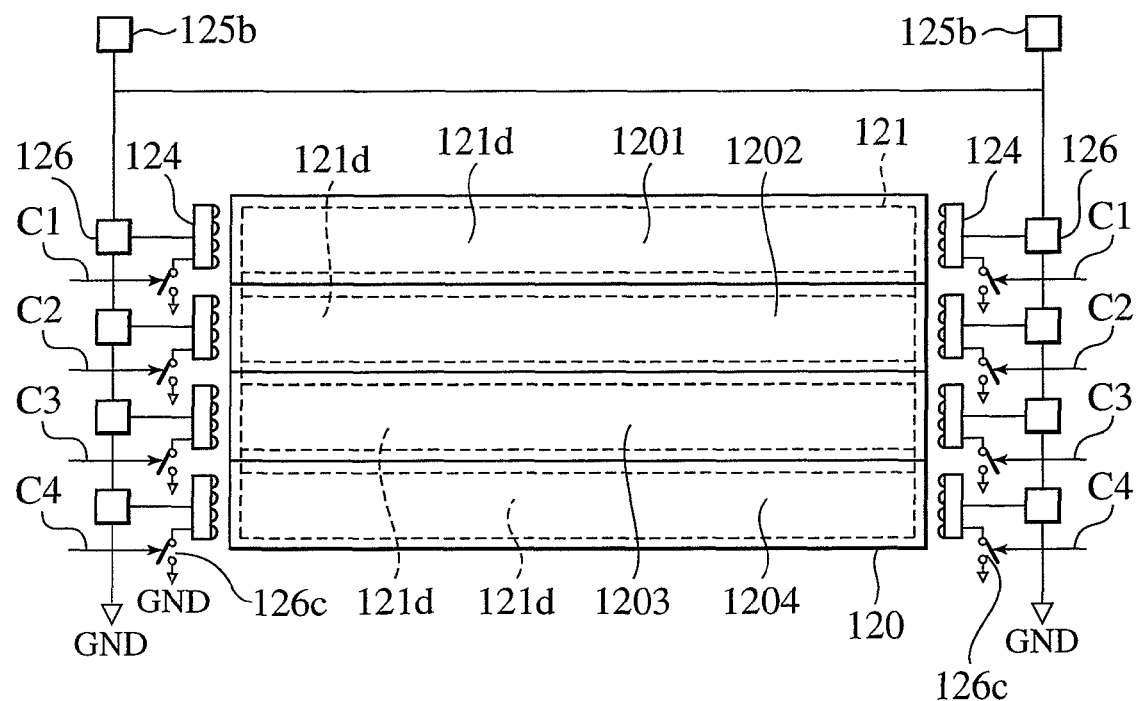

LIQUID CRYSTAL DISPLAY DEVICE COMPRISING AT LEAST ONE GROOVE HAVING AN END PORTION THAT STOPS SHORT OF THE NON-ADJACENT OPPOSITE SIDE SURFACES AND EXTENDS IN A DIRECTION PERPENDICULAR TO THE NON-ADJACENT SIDE SURFACES

BACKGROUND OF THE INVENTION

1. Field of the Invention

The present invention relates to a liquid crystal display device.

2. Description of the Related Art

In recent years, an emissive plasma display panel or non-emissive liquid crystal display device is frequently used as a display device in place of a CRT (Cathode Ray Tube).

The liquid crystal display device uses a liquid crystal panel as a transmissive light modulation device, provides the back surface of the liquid crystal panel with an illuminating device (also called a backlight), and irradiates the liquid crystal panel with light. The liquid crystal panel forms an image by controlling the transmission of light emitted from the backlight.

The liquid crystal display device is characterized by the fact that it can be thinner than the CRT. In recent years, however, it is demanded that the thickness of the liquid crystal display device be further reduced. A sidelight technology disclosed, for instance, in JP-A-2006-156324 (see FIG. 1) uses an LED (Light Emitting Diode) as a backlight source, but does not mount the backlight source on the rear of the liquid crystal panel. It positions the backlight source laterally and uses a light guide plate to emit light from the rear of the liquid crystal panel.

A technology for providing enhanced image quality by using a plurality of light sources and light guide plates is also known. A technology disclosed, for instance, in JP-A-2006-134748 (see FIG. 1) configures a liquid crystal panel light source in a plurality of regions by combining a plurality of light guide plates and linear or rod-shaped light sources such as straight fluorescent lamps.

SUMMARY OF THE INVENTION

An object of the present invention is to provide a liquid crystal display device that includes a light guide plate, manages a liquid crystal panel by dividing it into a plurality of regions, provides each managed region with a light source and light guide plate, and adjusts the brightness of each region to improve the contrast of each region in accordance with image data for each region and enhance the motion picture quality of the liquid crystal display device.

The technology disclosed in JP-A-2006-156324 cannot adjust the brightness of a particular region of the liquid crystal panel because it uses only one light guide plate. Therefore, it cannot improve the image quality of a particular region. It is not capable of improving the contrast if a part of a displayed image is white. Meanwhile, the use of the technology disclosed in JP-A-2006-134748 produces a striped image because the light guide plate is divided.

Under the above circumstances, it is an object of the present invention to provide a liquid crystal display device having a light guide plate that is capable of providing improved liquid crystal display performance without generating a striped image.

To achieve the above object, the present invention provides the rear of the liquid crystal panel with a light guide plate so as to irradiate the liquid crystal panel with a light ray emitted from a light source while a plurality of vertically arranged regions of a light guide plate surface positioned toward the liquid crystal panel are managed on an individual basis.

The present invention provides a liquid crystal display device having a light guide plate that is capable of providing improved liquid crystal display performance without generating a striped image. In addition, the present invention exhibits high productivity because it uses a single light guide plate without combining divided light guide plates.

BRIEF DESCRIPTION OF THE DRAWINGS

Other objects and advantages of the invention will become apparent from the following description of embodiments with reference to the accompanying drawings in which:

FIG. 4A is a layout drawing showing a light source and light guide plate. FIG. 4B shows the structure of the light source.

FIG. 9 shows liquid crystal panel regions, which correspond to rear surface divisions of the light guide plate.

DETAILED DESCRIPTION OF THE PREFERRED EMBODIMENTS

Embodiments of the present invention will now be described in detail with reference to the accompanying drawings.

Figure 1:
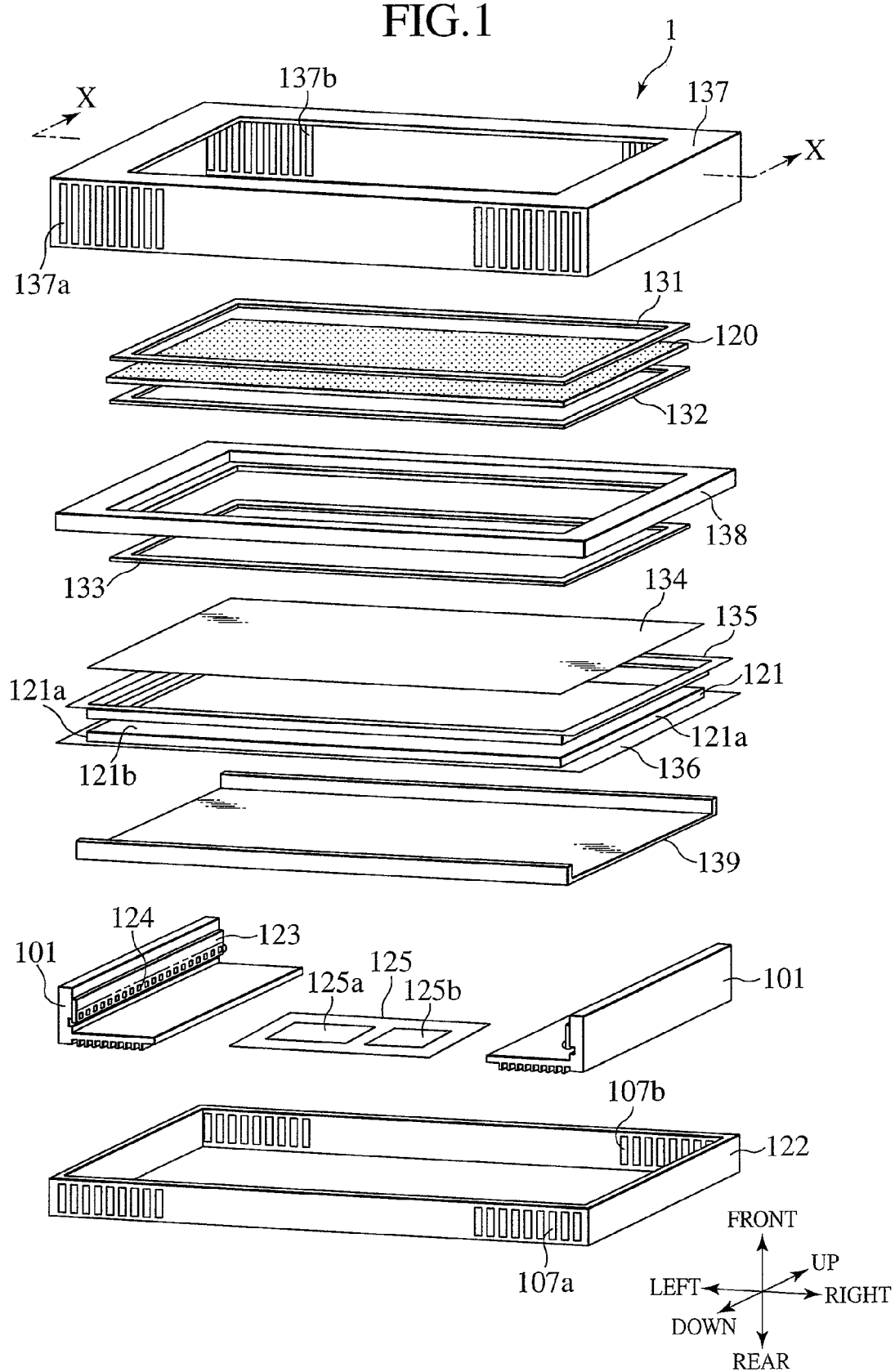
FIG. 1 is an exploded perspective view showing a liquid crystal display device according to an embodiment of the present invention.
Figure 2:
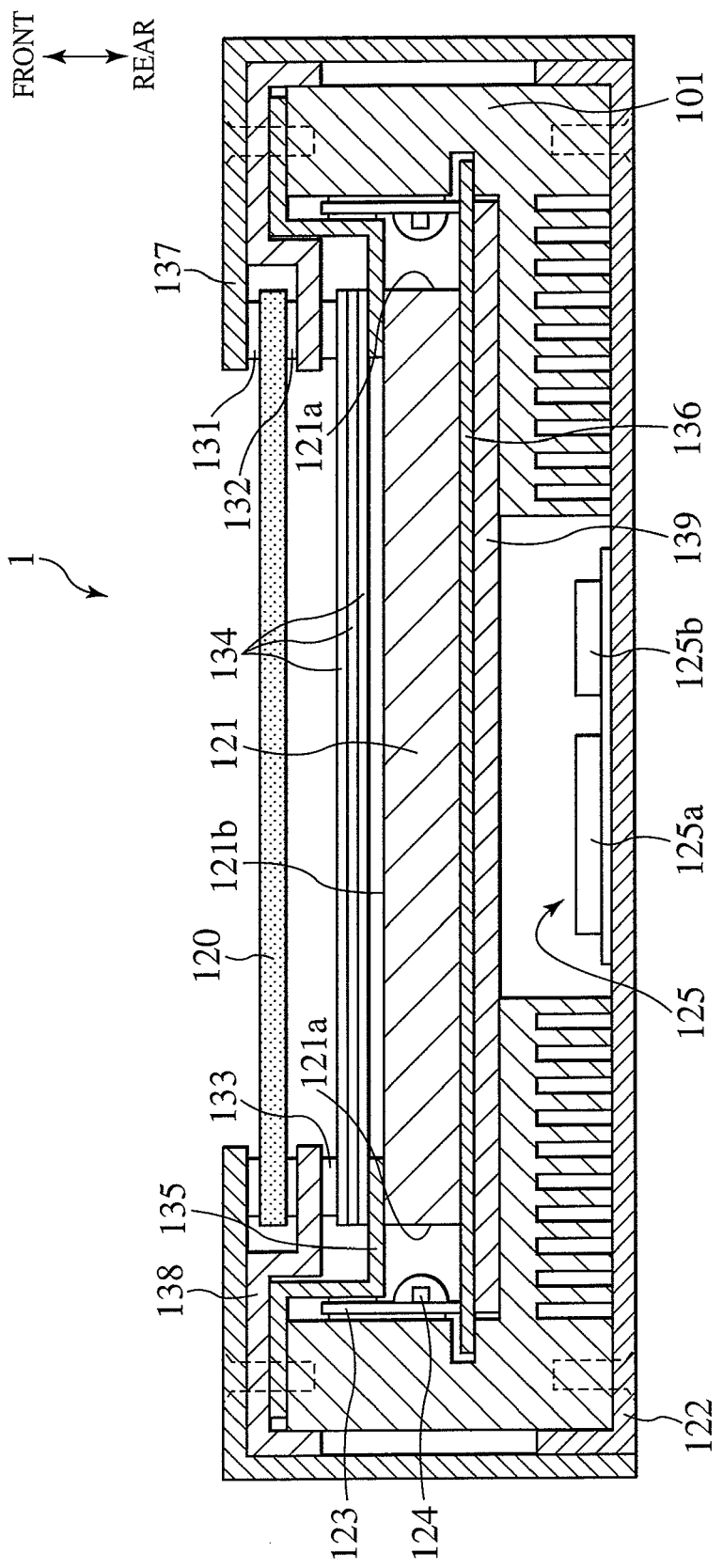
FIG. 2 is a cross-sectional view taken along line X-X of FIG. 1.
Figure 3A:
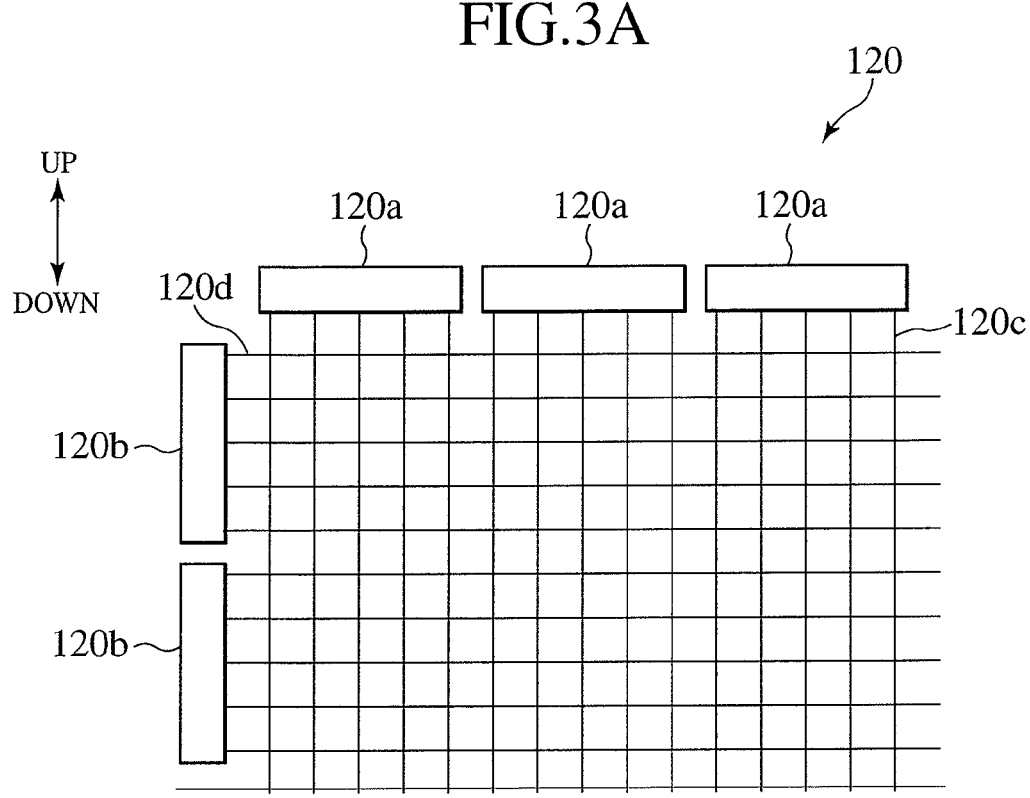
FIG. 3A is a layout drawing showing liquid crystal panel wiring and driving circuits.
Figure 3B:
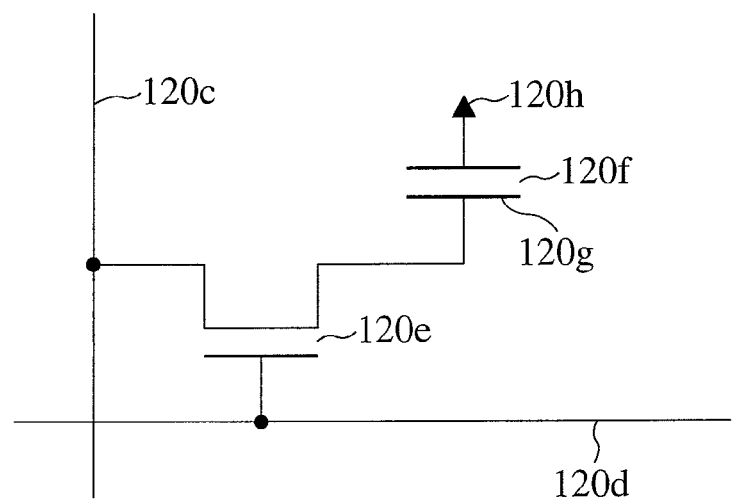
FIG. 3B is a layout drawing showing a TFT and pixel electrode.
Figure 5:
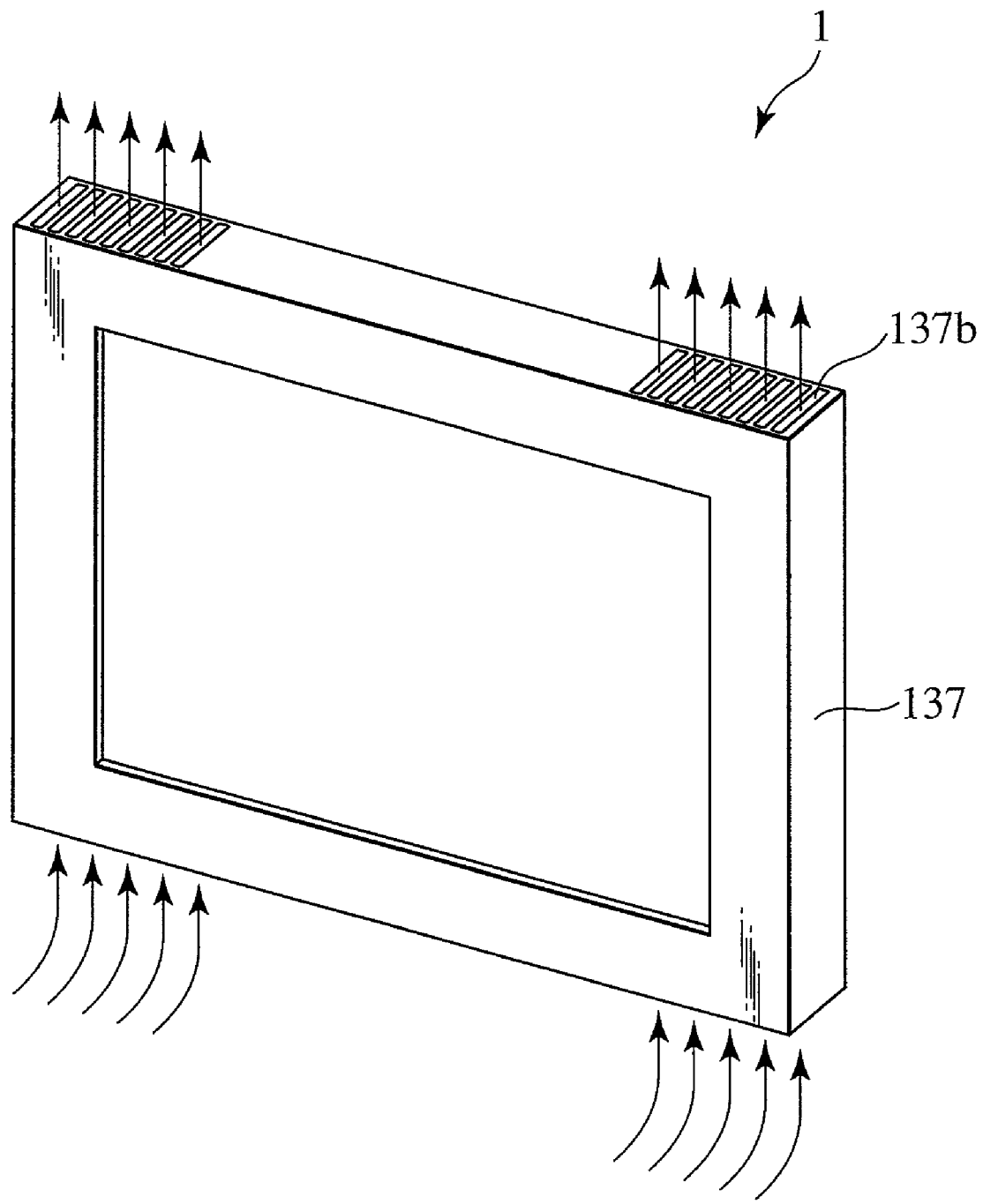
FIG. 5 shows an air intake/exhaust system for the liquid crystal display device.

FIG. 1 is an exploded perspective view showing a liquid crystal display device according to an embodiment of the present invention. FIG. 2 is a cross-sectional view taken along line X-X of FIG. 1. FIG. 3A is a layout drawing showing liquid crystal panel wiring and driving circuits. FIG. 3B is a layout drawing showing a TFT (Thin Film Transistor) and pixel electrode. FIG. 4A is a layout drawing showing a light source and light guide plate. FIG. 4B shows the structure of the light source. FIG. 5 shows an air intake/exhaust system for the liquid crystal display device. As regards the present embodiment, the upper, lower, left, right, front, and rear surfaces are defined with reference to the display screen of a liquid crystal panel 120 as shown in FIG. 1.

As shown in FIG. 1, the liquid crystal display device 1 according to the embodiment of the present invention includes a liquid crystal panel 120, a light guide plate 121, a rear cover 122, a light source 124, a light source mounting substrate 123, and a heatsink 101. The liquid crystal display device 1 also includes a first frame 137, a first rubber cushion 131, a second rubber cushion 132, a second frame 138, an optical sheet 134, a first reflective sheet 135, a second reflective sheet 136, and a third frame 139.

The light guide plate 121, which will be described in detail later, is mounted on the rear surface of the liquid crystal panel 120. A substrate 123 that carries a light source 124 is mounted on the left and right side surfaces of the light guide plate 121. The side surface on which the light source 124 for the light guide plate 121 is mounted is referred to as an incidence plane 121*a*. The front surface positioned toward the liquid crystal panel 120 is referred to as an output plane 121*b*.

As shown in FIG. 2, there is a space between the light guide plate 121 and rear cover 122. The heatsink 101 is stretched in that space.

The liquid crystal panel 120 is configured so that a liquid crystal is sandwiched between two glass substrates. The liquid crystal panel 120 functions as an optical shutter that provides transmission/interception control over the light emitted from the light guide plate 121 by controlling the orientational state of liquid crystal molecules constituting the liquid crystal.

As shown in FIG. 3A, the liquid crystal panel 120 includes a data line 120*c*, a gate line 120*d*, a source driver 120*a*, and a gate driver 120*b*. The data line 120*c* and gate line 120*d* are arranged in a grid pattern. The source driver 120*a* drives the data line 120*c*. The gate driver 120*b* drives the gate line 120*d*.

As shown in FIG. 3B, a TFT 120*e*, which drives the liquid crystal 120*f*, is connected to a grid point of the data line 120*c* and gate line 120*d*. When a positive voltage is applied to the gate line 120*d*, the TFT 120*e* provides conduction between the data line 120*c* and pixel electrode 120*g*. In this instance, the data line 120*c* applies a voltage to the pixel electrode 120*g* in accordance with image data. The shutter for the liquid crystal 120*f* opens or closes in accordance with the voltage between the pixel electrode 120*g* and common electrode 120*h*. When the shutter for the liquid crystal 120*f* opens, a bright pixel occurs because the light emitted from the output plane 121*b* of the light guide plate 121 shown in FIG. 1 is transmitted. While the shutter for the liquid crystal 120*f* is not open, a dark pixel occurs.

The relationship between the open/closed state of the liquid crystal shutter and the voltage applied to the liquid crystal 120*f* (nearly equal to the voltage between the pixel electrode 120*g* and common electrode 120*h*) depends on the so-called display mode of the liquid crystal 120*f*. A typical display mode of a common television receiver liquid crystal panel 120 (see FIG. 1) is such that a bright pixel occurs when the absolute value of the voltage applied to the liquid crystal 120*f* is great (approximately 5 V), and that a dark pixel occurs when it is small (approximately 0 V). As regards a voltage between 0 V and 5 V, the pixel brightness increases nonlinearly with an increase in the absolute value of the voltage. Different tones can be displayed by defining different voltage levels between 0 V and 5 V. It goes without saying that the present invention does not specifically define the display mode.

While a negative voltage is applied to the gate line 120*d* connected to the TFT 120*e*, the resistance between the data line 120*c* and pixel electrode 120*g* is high so that the voltage applied to the liquid crystal 120*f* is maintained.

As described above, the employed configuration is such that the liquid crystal 120*f* is controlled by the voltages applied to the gate line 120*d* and data line 120*c*.

The gate driver 120*b* has a scanning function for applying a predetermined voltage to one gate line 120*d* at regular intervals, for instance, in a sequential manner from top to bottom. The source driver 120*a* applies to each data line 120*c* a voltage corresponding to each pixel connected to the gate line 120*d* to which the gate driver 120*b* applies a predetermined voltage.

When the configuration described above is used, the gate line 120*d* to which a voltage is applied can perform setup for bright pixels and dark pixels. Further, as the source driver 120*a* controls the voltage applied to each data line 120*c* in accordance with a scan performed by the gate driver 120*b*, bright pixels and dark pixels can be set up for all gate lines 120*d*. As a result, an image can be formed on the liquid crystal panel 120.

The source driver 120*a* and gate driver 120*b* may be configured so that they are controlled, for instance, by a control device 125*a* (see FIG. 1).

For example, the control device 125*a* is capable of managing the image signal to be displayed on the liquid crystal panel 120 as brightness information about each liquid crystal 120*f* (see FIG. 3B). Further, the employed configuration may be such that the gate driver 120*b* is controlled to perform a scan for applying a predetermined voltage to one gate line 120*d* in a sequential manner from top to bottom while the source driver 120*a* is controlled so as to apply a predetermined voltage to each data line 120*c* in accordance with the brightness information about a data line 120*c* on the gate line 120*d* to which a predetermined voltage is applied.

Returning to FIG. 1, the light guide plate 121 is made of acrylic or other transparent plastic and capable of converting a light ray emission from the light source 124 (a point light source) to a surface light source. Further, as shown in FIG. 2, the light guide plate 121 is mounted on the rear of the liquid crystal panel 120 via the second frame 138, the second rubber cushion 132, and the optical sheet 134, and can convert a light ray emission from the light source 124 (a point light source) to a surface light source. Therefore, the substrate 123 having the light source 124 is positioned on the right and left side surfaces of the light guide plate 121. As mentioned earlier, the light guide plate 121 has the incidence plane 121*a* and output plane 121*b*.

As shown in FIG. 4A, the employed structure is that the light source 124 is positioned along the incidence plane 121*a* of the light guide plate 121, and that the light ray emitted from the light source 124 is incident on the light guide plate 121 through the incidence plane 121*a*. The light source 124 is capable of emitting light that the liquid crystal panel 120 (see FIG. 1) uses to display an image.

The light source 124 is configured as shown in FIG. 4B so that a plurality of LEDs 124*a* (e.g., R (red), G (green), and B (blue) LEDs are alternately positioned) are secured to the substrate 123 and electrically connected to a wiring pattern 124*b*, which is formed on the substrate 123 by means, for instance, of bonding. Further, a lens 124*c* for scattering the light emission in an appropriate manner covers the top of the light emitting surface. The light source 124 can emit light because current and voltage are supplied to the light source 124 through the wiring pattern 124*b*. For example, a ceramic substrate having a low thermal resistance may be used as the substrate 123. As far as the substrate 123 is connected to the heatsink 101 and secured as shown in FIG. 4A, the heat generated by the light source 124 can be effectively transferred to the heatsink 101.

The light ray incident on the light guide plate 121 through the incidence plane 121a is repeatedly reflected for propagation within the light guide plate 121, scattered by a reflective dot (not shown), which is printed on the rear of the light guide plate 121, and output from the output plane 121b, which is positioned in front of the light guide plate 121. Further, the second reflective sheet 136 is mounted on the rear of the light guide plate 121 as shown in FIG. 2 so that a light ray directed toward the rear of the light guide plate 121 in spite of total reflection condition setup returns to the light guide plate 121. This ensures that the liquid crystal panel 120 (see FIG. 1) is illuminated with high efficiency.

As described above, the present embodiment is configured so that the light ray emitted from the output plane 121b of the light guide plate 121 illuminates the liquid crystal panel 120 from its rear.

Returning again to FIG. 1, the rear cover 122 is made, for instance, of plastic to function as a protective cover for the rear of the liquid crystal display device 1. The lower side surface of the rear cover 122 has an air inlet 107a for air intake, whereas the upper side surface of the rear cover 122 has an air outlet 107b for air exhaust.

The first frame 137 is made, for instance, of plastic, and mounted on the front of the liquid crystal panel 120 to function as a front cover for the liquid crystal display device 1. Further, the first frame 137 has an opening so that the display area of the liquid crystal display device 1 is exposed to view. The lower side surface of the first frame 137 has an air inlet 137a for air intake, whereas the upper side surface of the first frame 137 has an air outlet 137b for air exhaust.

The employed configuration is such that when the first frame 137 is combined with the rear cover 122 to form a housing for the liquid crystal display device 1, the air outlet 137b in the first frame 137 communicates with the air outlet 107b in the rear cover 122 whereas the air inlet 137a in the first frame 137 communicates with the air inlet 107a in the rear cover 122.

The first rubber cushion 131 is mounted on the front of the liquid crystal panel 120 to function as a support member for the first frame 137 and liquid crystal panel 120. The second rubber cushion 132 is mounted on the rear of the liquid crystal panel 120 to function as a buffer for the liquid crystal panel 120 and second frame 138.

The second frame 138 functions to support the liquid crystal panel 120. Further, the second frame 138 is positioned between the heatsink 101 and liquid crystal panel 120 to function as a thermal insulator that prevents the heatsink 101 from transferring its heat to the liquid crystal panel 120.

The optical sheet 134 is mounted on the rear of the second frame 138 and provided with a directionality function, which provides increased in-plane uniformity of a light emission from the light guide plate 121 and increases frontal brightness. The number of optical sheets 134 is not limited by the present invention. However, the present embodiment assumes that three optical sheets 134 are used as shown in FIG. 2. Further, a buffer 133 made, for instance, of rubber or other elastic material is positioned between the second frame 138 and optical sheet 134 to absorb the shock of an impact input, for instance, from the first frame 137.

The first reflective sheet 135 is mounted on the rear of the optical sheet 134. The first reflective sheet 135 functions so that a light ray emitted from the light source 124 but not incident on the light guide plate 121 is reflected and incident on the light guide plate 121. The first reflective sheet 135 also functions so that a light ray emitted from the output plane 121b of the light guide plate 121 near the light source 124 returns to the light guide plate 121. As the R, G, and B light outputs are not uniform near the light source 124, such a portion cannot be used as the plane of display. Under such circumstances, the loss of a light ray can be reduced by allowing the first reflective sheet 135 to return the light ray near the light source 124 to the light guide plate 121.

The second reflective sheet 136 is mounted on the rear of the light guide plate 121. The second reflective sheet 136 increases the efficiency of light ray utilization by ensuring that a light ray emitted from the light source 124 but not directly incident on the light guide plate 121 is reflected and incident on the light guide plate 121. The second reflective sheet 136 also functions so that a light ray directed toward the lower surface of the light guide plate 121 in spite of total reflection condition setup returns to the light guide plate 121.

The heatsink 101 is made of copper, aluminum, or other highly thermal conductive metal material and capable of efficiently dissipating the heat generated by the light source 124. The heatsink 101 is connected, for instance, with a thermal conductive bonding member to a portion of the substrate 123 on which no light source 124 is mounted. Heat dissipation occurs when the heat generated by the light source 124 is transferred to the heatsink 101.

Further, the liquid crystal panel 120 and light guide plate 121 are housed in a virtual rectangular parallelepiped that circumscribes the heatsink 101. Therefore, the heatsink 101 also functions to protect the liquid crystal panel 120 and light guide plate 121 when a load is imposed on the liquid crystal display device.

The heatsink 101 is substantially L-shaped when viewed from above. As shown in FIG. 2, a bent portion of the heatsink 101 is positioned between the light guide plate 121 and rear cover 122.

The heat generated by the light source 124 is transferred to the heatsink 101, diffused in the planar direction by the heatsink 101, which is mounted on the rear of the light guide plate 121, and dissipated into the air that flows between the light guide plate 121 and rear cover 122. The air flows upward between the light guide plate 121 and rear cover 122 due to natural convection.

As shown in FIG. 5, outside air is subsequently taken into the liquid crystal display device 1 through the air inlet 137a in the first frame 137 (see FIG. 1) and the air inlet 107a in the rear cover 122 (see FIG. 1), and discharged from the air outlet 137b in the first frame 137 and the air outlet 107b in the rear cover 122 (see FIG. 1).

As described above, the present embodiment assumes that a gap for vertical heat release from the display screen of the liquid crystal display panel 120, that is, a ventilation path, is provided between the light guide plate 121 and rear cover 122 as shown in FIG. 2. The heatsink 101, which is installed in the ventilation path, cools when air flows in the ventilation path due to natural convection from the air inlet 137a in the first frame 137 (see FIG. 1) and the air inlet 107a in the rear cover 122 (see FIG. 1) to the air outlet 137b in the first frame 137 (see FIG. 1) and the air outlet 107b in the rear cover 122 (see FIG. 1).

The present embodiment also includes the control device 125a, which controls the liquid crystal display device 1 (see FIG. 1), and a drive section 125, which includes, for instance, a DC/DC power supply 125b for supplying a supply voltage, for instance, to the light source 124. The control device 125a controls the liquid crystal panel 120, light source 124, and other components and processes the image to be displayed on the liquid crystal display device 1. For example, the control device 125a includes a computer having a CPU (Central Processing Unit), a RAM (Random Access Memory), a ROM (Read Only Memory), and other devices, a program, and peripheral circuits, which are not shown, and is driven by a program stored in the ROM.

The liquid crystal display device 1 (see FIG. 1) according to the present embodiment is characterized in that a concave groove 121c, which will be described later, is formed on the rear surface (the surface opposite the output plane 121b) of the output plane 121b (see FIG. 4A) of the light guide plate 121 to vertically divide the output plane 121b.

Figure 6A:
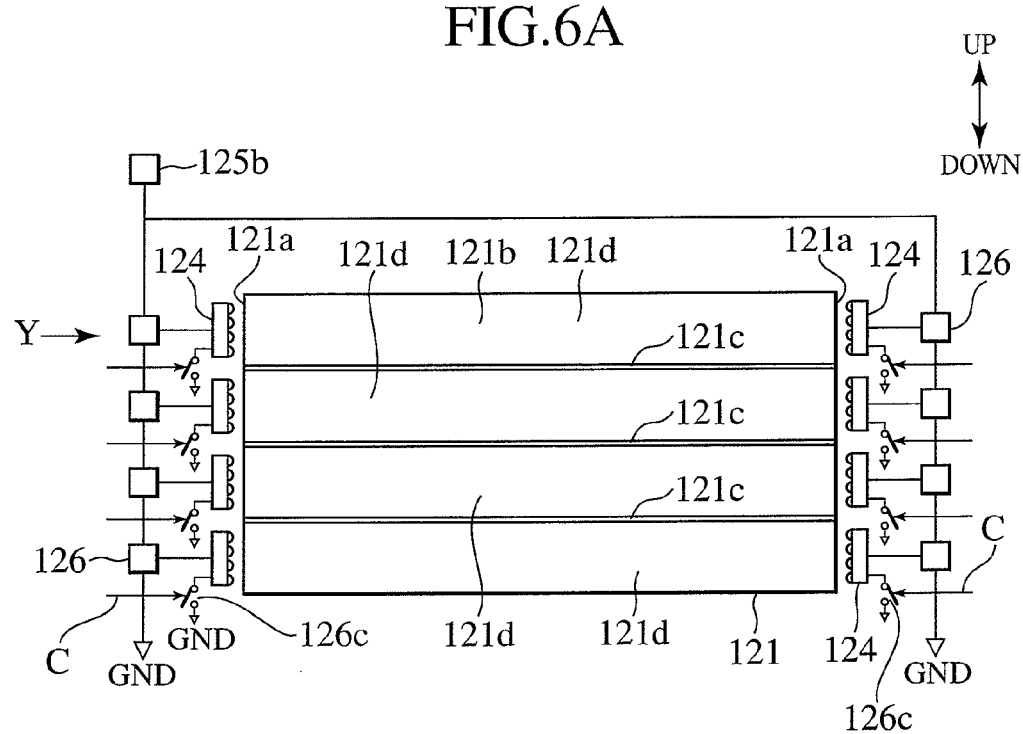
FIG. 6A is a layout drawing showing a light source and light guide plate as viewed from the rear of the light guide plate according to an embodiment of the present invention.
Figure 6B:
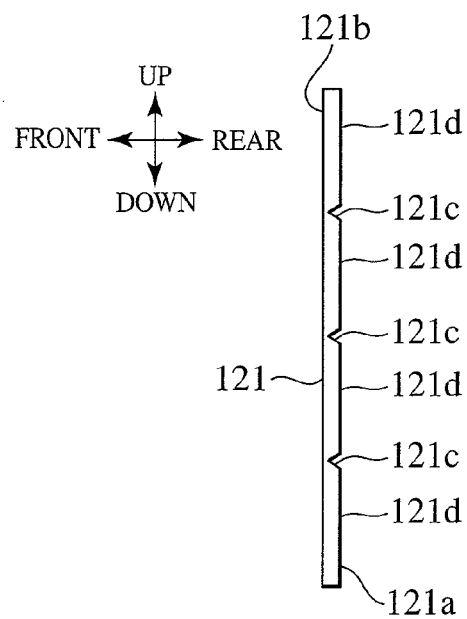
FIG. 6B is a Y-directional view of the light guide plate shown in FIG. 6A.
Figure 6C:
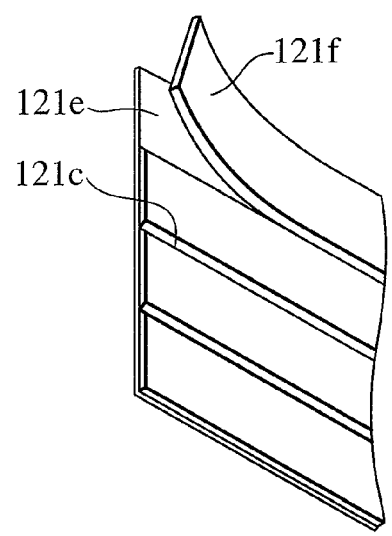
FIG. 6C shows how a second sheet is attached to a first sheet.

FIG. 6A is a layout drawing showing a light source and light guide plate as viewed from the rear of the light guide plate according to the present embodiment. FIG. 6B is a Y-directional view of the light guide plate shown in FIG. 6A. FIG. 6C shows how a second sheet is attached to a first sheet.

As shown in FIG. 6A, the rear surface of the output plane 121b of the light guide plate 121, that is, the rear surface of the plane facing the liquid crystal panel 120 (see FIG. 1), is divided into two or more regions (hereinafter referred to as the rear surface divisions 121d) by the concave grooves 121c parallel to the upper end. The concave grooves 121c are formed in parallel, for instance, with the upper end of the light guide plate 121 in a direction from one incidence plane 121a to the other incidence plane 121a. As shown in FIG. 6A, the present embodiment assumes that the light guide plate 121 is separated into four rear surface divisions 121d by three concave grooves 121c. However, the number of rear surface divisions 121d is not limited to four.

Figure 11:
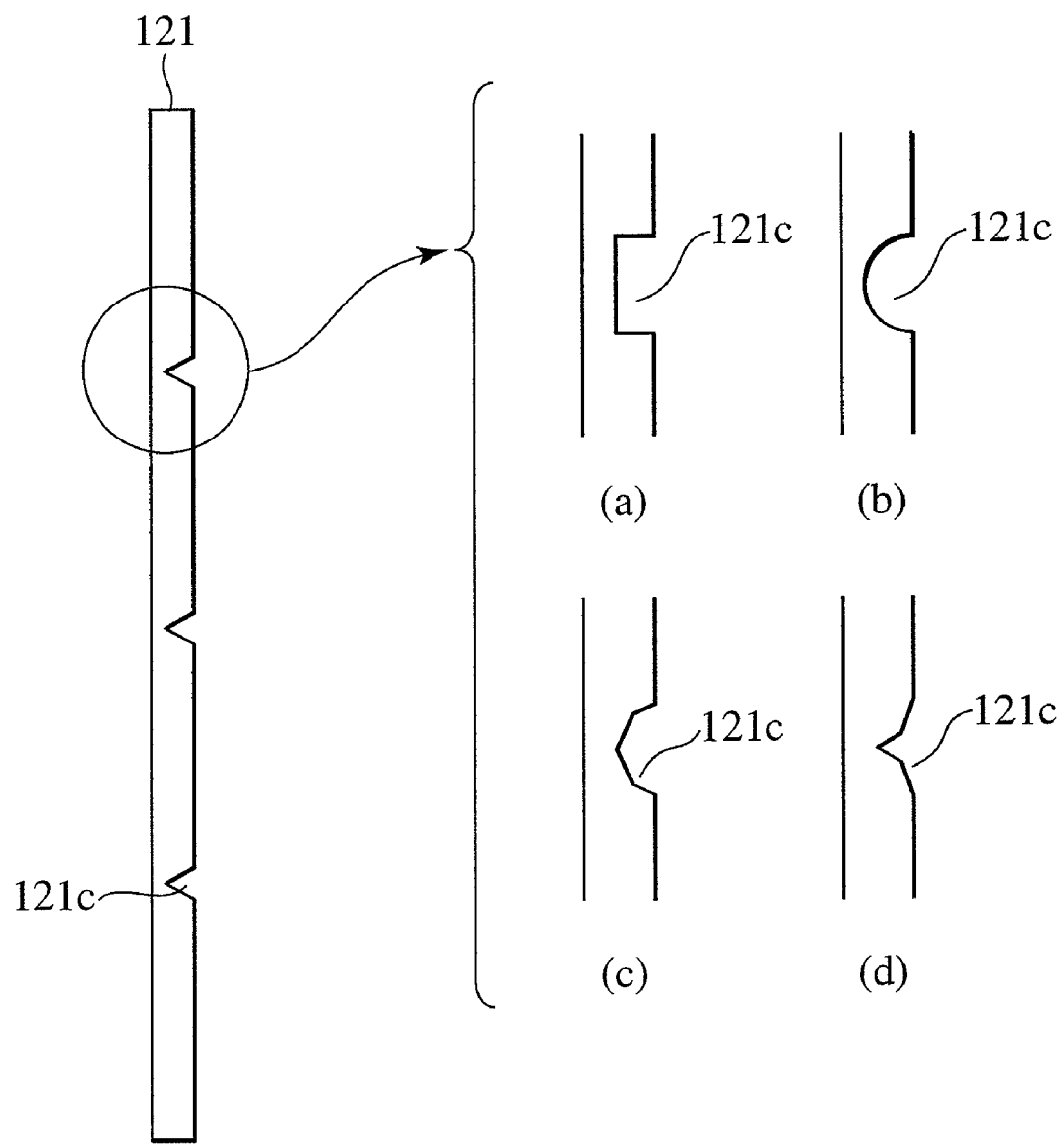
FIG. 11 shows typical shapes of the concave grooves in the light guide plate.

Although FIG. 6A indicates that the concave grooves 121c are formed on the rear surface of the output plane 121b, the present invention is not limited to such a concave groove formation. Alternatively, the concave grooves 121c may be formed on the output plane 121b to divide the output plane 121b. Although FIG. 6B indicates that V-shaped concave grooves 121c are used, the present invention is not limited to the use of V-shaped concave grooves 121c. Alternatively, the present invention may use rectangular or semicircular concave grooves. FIG. 11 shows typical shapes of the concave grooves 121 ((a) to (d)). The cross section of concave groove (a) in FIG. 11 is rectangular. The cross section of concave groove (b) in FIG. 11 is a semicircle having a certain curvature. The cross section of concave groove (c) is polygonal. The cross section of concave groove (d) in FIG. 11 is polygonal and provided with a V-shaped leading end.

As shown in FIG. 6B, the concave grooves 121c according to the present embodiment are formed so as to vertically separate the rear end of the output plane 121b of the light guide plate 121 into substantially equal divisions. Although FIG. 6B indicates that the rear end is vertically separated into substantially equal divisions, the present invention may vertically separate the rear end into unequal divisions. For example, the upper and lower central regions may be narrowed to expand the upper and lower lateral end regions for the purpose of allowing the upper and lower central regions to have higher luminance than the upper and lower lateral end regions. The width and depth of the concave grooves 121c are not specifically defined. For example, the concave grooves 121c may have a width of approximately 0.5 to 1.0 mm and a depth of approximately 50 to 60% of the thickness of the light guide plate 121. When the concave grooves 121c are formed as described above, the rear end of the output plane 121b of the light guide plate 121 has concave and convex sections due to the concave grooves 121c. Further, one rear surface division 121d shown in FIG. 6A is a convex section when viewed from the incidence plane 121a.

The incidence plane 121a of the light guide plate 121 is provided with the light sources 124 that are positioned relative to the rear surface divisions 121d. In other words, the light sources 124 are positioned relative to the convex sections that are formed by the concave grooves 121c. Consequently, a light ray emitted from a light source 124, which is incident on a convex section of the incidence plane 121a, is output from the output plane 121b that faces the associated rear surface division 121d.

Since the present embodiment uses three concave grooves 121c to separate the incidence plane 121a into four regions, one incidence plane 121a is provided with four light sources 124. Each light source 124 is driven by a current that is output, for instance, from the DC/DC power supply 125b, and equipped with an LED driving circuit 126 (light source driving means) and a switch 126c. If, for instance, the switch 126c is open/close controlled by a control signal C output from the control device 125a (see FIG. 1) to turn on/off the light source 124 in accordance with the open/closed state of the switch 126c, the brightness of each of the four rear surface divisions 121d is independently controlled by a command from the control device 125a. In other words, the LED driving circuit 126 individually controls the light sources 124 that are provided for all regions. In the present embodiment, the light sources 124 shown in FIG. 6A include a plurality of LEDs 124a. The plurality of LEDs included in each light source are simultaneously driven by the LED driving circuit 126 related to the light source to which the LEDs belong. In other words, the plurality of LEDs included in a specific light source are simultaneously illuminated and extinguished.

However, the present invention does not always assume that the plurality of LEDs included in each light source are simultaneously driven. For example, the plurality of LEDs included in each light source may be controlled individually or groupwise. An intended effect is produced when at least two rear surface divisions 121d exist and at least one of the LEDs positioned relative to one rear surface division 121d and at least one of the LEDs positioned relative to the other rear surface division 121d are separately controlled.

FIG. 6A, which depicts the present embodiment, assumes that the right and left light sources 124 at both ends of a rear surface division 121d perform the same operation.

When the LEDs 124a of the light sources 124 (see FIG. 4B) are illuminated by a PWM (Pulse Width Modulation) signal, the control device 125a (see FIG. 1), for example, may decrease the light intensity of the light sources 124 by instructing the LED driving circuit 126 to change the pulse width of the PWM signal.

The concave grooves 121c may be formed, for instance, by performing injection molding when the light guide plate 121 is molded or by machining a molded light guide plate 121. Alternatively, the light guide plate 121 may be formed by attaching second sheets 121f, which have substantially the same width as a rear surface division 121d and are made of the same material as the light guide plate 121, to a first sheet 121e, which has the same planar shape as the light guide plate 121 and is made of the same material as the light guide plate 121, in such a manner as to form the concave grooves 121c as shown in FIG. 6C. The second sheets 121f can be attached to the first sheet 121e, for instance, by using an adhesive or thermocompression bonding technique. If an adhesive is used to achieve the purpose, it should preferably be colorless and transparent and have the same refractive index as the light guide plate 121. When, for instance, the light guide plate 121 is made of an acrylic material, an adhesive made of acrylic plastic should be used.

Figure 7:
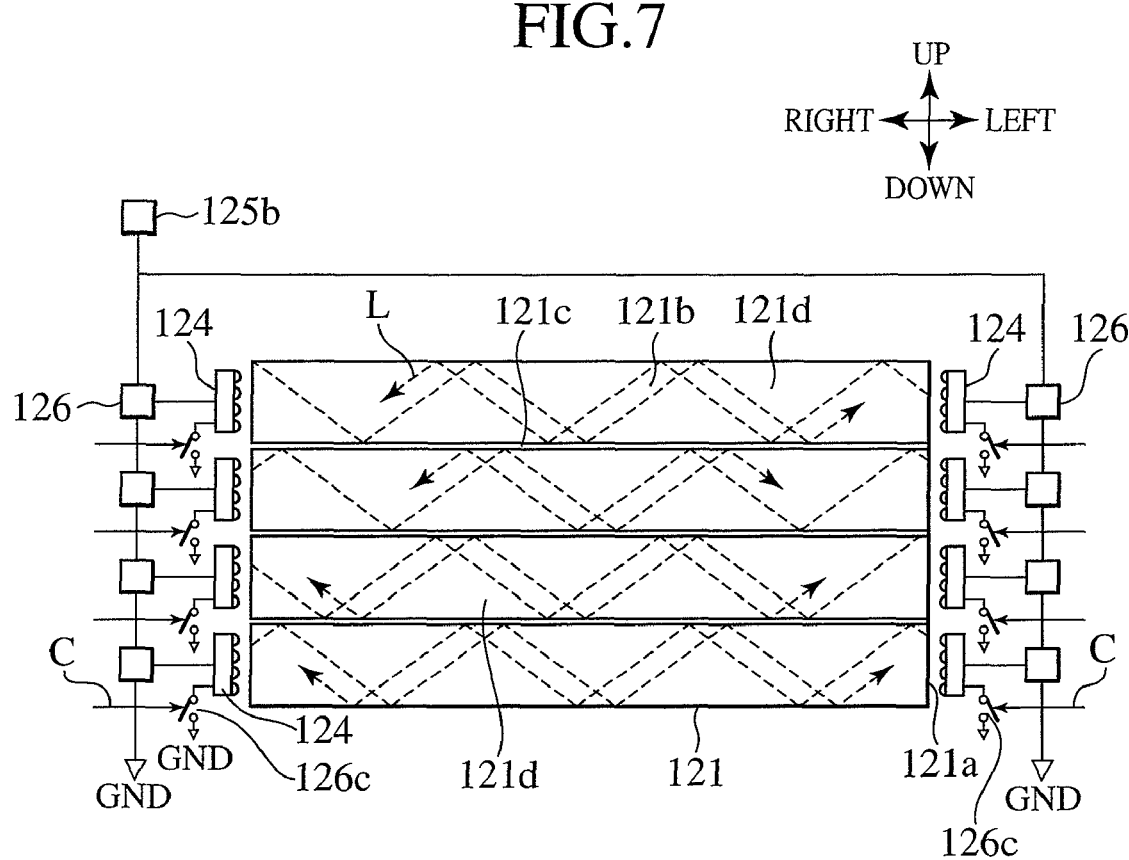
FIG. 7 is a schematic diagram showing how light rays emitted from light sources propagate through the light guide plate having concave grooves.

FIG. 7 is a schematic diagram showing how light rays emitted from the light sources propagate through the light guide plate having concave grooves. As shown in FIG. 7, a light ray emitted from a light source 124 travels through one of the separated regions of the incidence plane 121*a* and is incident on the rear surface division 121*d* associated with that region. The incident light ray L propagates while bouncing off the walls formed by the concave grooves 121*c* and rear surface divisions 121*d* (or bouncing off the upper and lower end faces of the light guide plate 121). Further, part of the incident light ray L is emitted from the output plane 121*b* (see FIG. 2), which faces the rear surface divisions 121*d*, toward the liquid crystal panel 120 (see FIG. 2) to illuminate the liquid crystal panel 120. Since the light ray L incident on a rear surface division 121*d* propagates while bouncing off in a vertical direction due to the concave grooves 121*c* as described above, it rarely falls upon the other rear surface divisions 121*d*. Therefore, controlling the light intensity of a light source 124 that sheds a light ray L on a rear surface division 121*d* makes it possible to control the brightness of the rear surface division 121*d* upon which the light ray L emitted from the light source 124 is incident. It should be noted, however, that in the incidence plane 121*a* of the light guide plate 121, the light emitted from a light source near a concave groove 121*c* does not always fall upon the associated rear surface division 121*d*. More specifically, part of the light emitted from a light source near a concave groove 121*c* may be sparingly incident on a neighboring region depending on the spread of the light emitted from the light source.

The contrast of an image displayed by the liquid crystal display device 1 (see FIG. 1) is indicated by the ratio between a high luminance for displaying the white color and a low luminance for displaying the black color. The greater the ratio value, the higher the contrast, and thus the higher the image quality. When the liquid crystal panel 120 (see FIG. 1) is used, the high luminance for displaying the white color is approximately 500 cd/m$^2$, whereas the low luminance for displaying the black color is approximately 0.5 cd/m$^2$. Therefore, the contract indicated by the ratio between the above two luminance values is approximately 1000 (500/0.5). This contrast value is lower than the contrast value (approximately 10,000) of a CRT, which has been conventionally used as a display device. Therefore, it is demanded that the liquid crystal display device 1 exhibit increased contrast.

As regards a video signal, the ideal video level for displaying the black color is "0". It is therefore preferred that the luminance of the liquid crystal panel 120 (see FIG. 1) be "0" when the liquid crystal display device 1 (see FIG. 1) displays the black color. However, the characteristics of the liquid crystal panel 120 are such that the light ray emission from the light source 124 (see FIG. 1) appears on the liquid crystal display device 1 as a light leak from the liquid crystal panel 120 even when the black color is to be displayed. Thus, the resulting luminance is not "0". Such light leakage is one of the causes of a low contrast of the liquid crystal display device 1.

Under the above circumstances, it is possible to improve the contrast of the liquid crystal display device 1 (see FIG. 1) by individually managing a plurality of display regions of the liquid crystal panel 120 (see FIG. 1) and turning off the backlight for illuminating a generally dark region, that is, a region where the black color is predominant (or by lowering the illumination level of the backlight). It is therefore necessary to turn on/off (or exercise brightness control over) the backlight for each of the plurality of regions of the liquid crystal panel 120, which are separated for management purposes.

The present embodiment is characterized in that three concave grooves 121*c* are made in the rear surface of the light guide plate 121 to form four rear surface divisions 121*d* as shown in FIG. 6A. Further, one side of the light guide plate 121 is provided with four light sources 124 so that a light ray L (see FIG. 7) is incident on each rear surface division 121*d*. In the present embodiment, the light sources 124 are positioned on both sides of the light guide plate 121. Therefore, the present embodiment includes a total of eight light sources 124. The employed configuration may be such that on/off control is exercised over each light source 124 by allowing the LED driving circuit 126 to drive each light source 124 and permitting, for instance, the control device 125*a* (see FIG. 1) to control the switch 126*c*. In the present embodiment, two light sources 124 provided for both ends of a rear surface division 121*d* perform the same operation. More specifically, the light sources 124 provided for both ends of a rear surface division 121*d* are equally driven as one unit.

The light guide plate 121, on which the rear surface divisions 121*d* are formed, is positioned to face the liquid crystal panel 120 (see FIG. 1). Therefore, the control device 125*a* (see FIG. 1), which controls, for instance, the liquid crystal display device 1, manages four display regions of the liquid crystal panel 120, which respectively correspond to the four rear surface divisions 121*d* of the light guide plate 121.

When it is judged that the black color is predominant in a display region of the liquid crystal panel 120, the control device 125*a*, which controls the liquid crystal display device 1, may control the switch 126*c* for a light source 124 that sheds a light ray on the rear surface division 121*d* associated with the aforementioned display region, and lower the level of illumination from the rear surface division 121*d* by shutting off the light ray L (see FIG. 7) emitted from the light source 124. In this manner, the brightness of the backlight of the liquid crystal panel 120 can be controlled on an individual display region basis.

For example, the control device 125*a* (see FIG. 1) can use the information about a displayed image to judge whether the black color is predominant in a display region of the liquid crystal panel 120 (see FIG. 1). As mentioned earlier, the control device 125*a* has the brightness information about an image displayed on the liquid crystal panel 120 in relation to each liquid crystal 120*f* (see FIG. 3B) of the liquid crystal panel 120. Therefore, the control device 125*a* can count the number of liquid crystals 120*f* having "black" information, that is, "dark" information. Thus, a definition may be formulated so that the black color is predominant in a display region in which the percentage of "dark" information is greater than a predetermined value, which is not limited and may be any appropriate value such as 70%.

As described above, the control device 125*a* (see FIG. 1) manages a plurality of display regions of the liquid crystal panel 120 (see FIG. 1), which respectively correspond to the rear surface divisions 121*d* of the light guide plate 121 as shown in FIG. 6A. When a region where the black color is predominant is found, the control device 125*a* can decrease the light intensity of a light source 124 for the associated rear surface division 121*d*. Decreasing the light intensity of the light source 124 for the rear surface division 121*d* lowers the illumination level of the backlight for the associated display region of the liquid crystal panel 120. This makes it possible to lower the region's low luminance for displaying the black color, thereby improving the overall contrast of the liquid crystal panel 120.

Further, the concave grooves 121*c* (see FIG. 6A) are formed in the surface of the light guide plate 121 (see FIG. 6A) according to the present embodiment as described earlier.

Therefore, the use of a plurality of light guide plates is not necessary. Only one light guide plate will suffice. This makes it possible to reduce the material cost and exclude a process for combining a plurality of light guide plates. Consequently, the resulting cost is lower than when a plurality of light guide plates are used. Excluding an unavoidable process makes it possible to reduce the power consumption and environmental load. Further, the structure formed by one light guide plate (including an assembly obtained by attaching a plurality of light guide plates to a single light guide plate (see FIG. 6C)) exhibits higher flexure strength than the structure formed by a plurality of completely separate light guide plates arranged in a striped pattern.

Furthermore, as the concave grooves 121c (see FIG. 6A) are formed in the rear surface of the light guide plate 121 (see FIG. 6A), the front surface of the light guide plate 121 is continuous without being grooved as shown in FIG. 6B. The light rays L (see FIG. 7) emitted from the light sources 124 (see FIG. 6A) are partly emitted from the front side of the concave grooves 121c. It means that the light rays L emitted from the concave grooves 121c are not zero. Therefore, the concave grooves 121c do not produce the black color. This produces an excellent effect by preventing the concave grooves 121c from generating a linear striped pattern in a display region of the liquid crystal panel 120 (see FIG. 1).

Figure 8A:
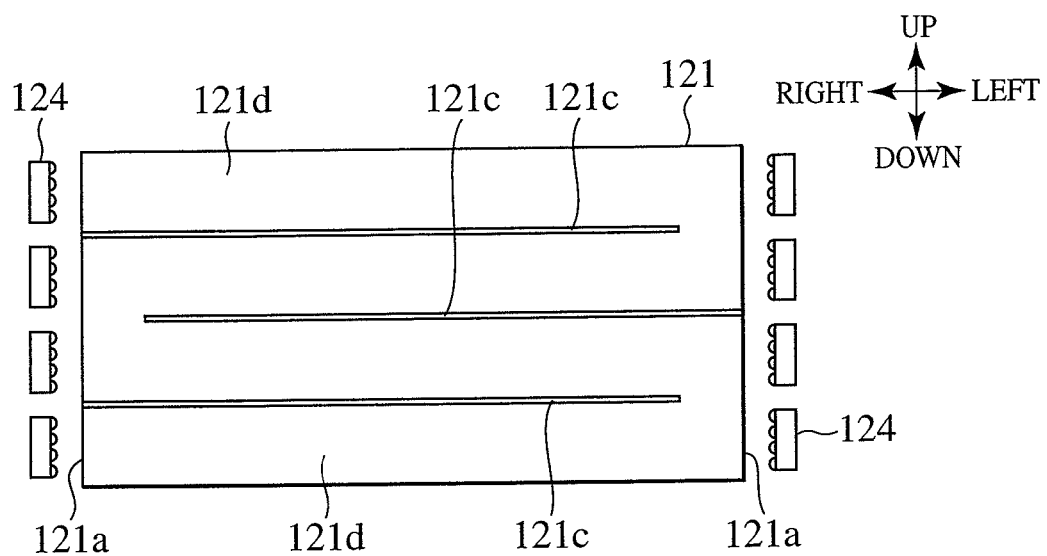
FIG. 8A indicates that one end of a concave groove does not reach an end of the light guide plate.
Figure 8B:
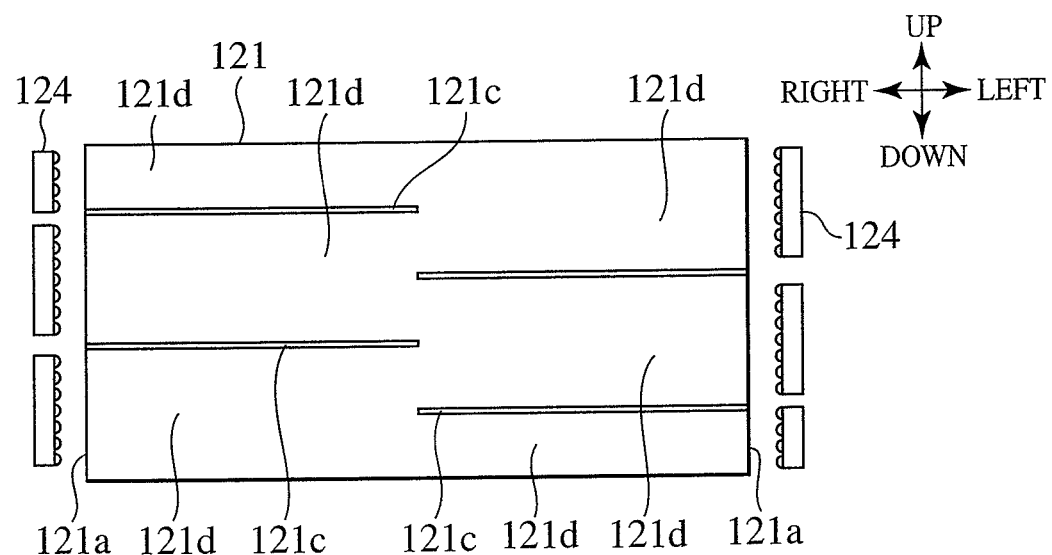
FIG. 8B indicates that concave grooves alternately extend from the right or left end to a substantially central position.

The present embodiment assumes that the concave grooves 121c are shaped so as to penetrate (extend) from one incidence plane 121a to the other incidence plane 121a as shown in FIG. 6A. However, the present invention is not limited to the use of such a groove shape. FIGS. 8A and 8B show the shapes of concave grooves as viewed from the rear surface divisions of the light guide plate. FIG. 8A indicates that one end of a concave groove does not reach an end of the light guide plate. FIG. 8B indicates that concave grooves alternately extend from the right or left end to a substantially central position.

As shown in FIG. 8A, the uppermost and lowermost concave grooves 121c, for example, may be formed so as to extend from the right incidence plane 121a to a position immediately before the left incidence plane 121a with the intermediate concave groove 121c formed so as to extend from the left incidence plane 121a to a position immediately before the right incidence plane 121a. In this instance, the concave grooves 121c do not penetrate (extend) from the right end to the left end. Consequently, the light guide plate 121 does not easily break along the concave grooves 121c.

As shown in FIG. 8B, two concave grooves 121c may alternatively be formed so as to extend from the right incidence plane 121a to a substantially central position while two additional concave grooves 121c, which alternate with the above two concave grooves 121c, are formed so as to extend from the left incidence plane 121a to a substantially central position. In other words, the concave grooves 121c may be formed to extend from one incidence plane 121a to a position before the other incidence plane 121a. When the concave grooves 121c are formed as described above, narrow rear surface divisions 121d and wide rear surface divisions 121d are formed on both the right and left sides of the light guide plate 121 as shown in FIG. 8B. Therefore, a narrow light source 124 emitting a small quantity of light may be provided for the narrow rear surface division 121d while wide light sources 124 emitting a large quantity of light are provided for the wide rear surface divisions 121d. When the employed configuration is as described above, the light guide plate 121 is separated into six rear surface divisions 121d. This makes it possible to manage six different display regions of the liquid crystal panel 120 (see FIG. 1). Consequently, the contrast of the image to be displayed can be finely controlled for contrast enhancement purposes.

Figure 12A:
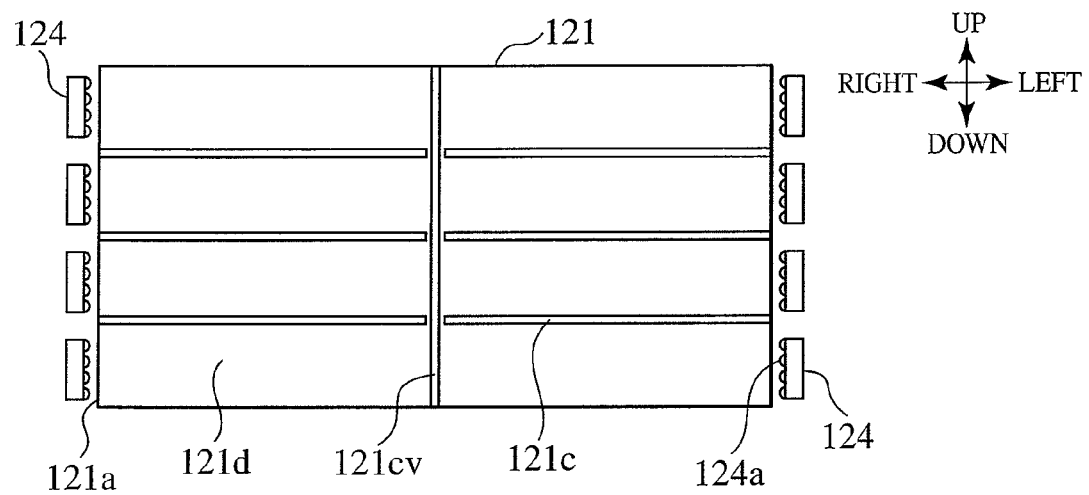
FIGS. 12A and 12B show some typical methods of dividing the light guide plate into a plurality of regions.

Further, when a concave groove 121cv perpendicular to the upper side of the light guide plate 121 is formed at the left-right center of the light guide plate 121 as shown in FIG. 12A, the regions of the light guide plate 121 can be clearly defined in left-right direction as compared with the case shown in FIG. 8B. In the case shown in FIG. 12A, eight different regions can be managed by individually controlling eight light sources 124.

Various light guide plate division methods other than those described with reference to FIGS. 8A, 8B, and 12A can be worked out by changing the combination of concave grooves and light sources.

Figure 12B:
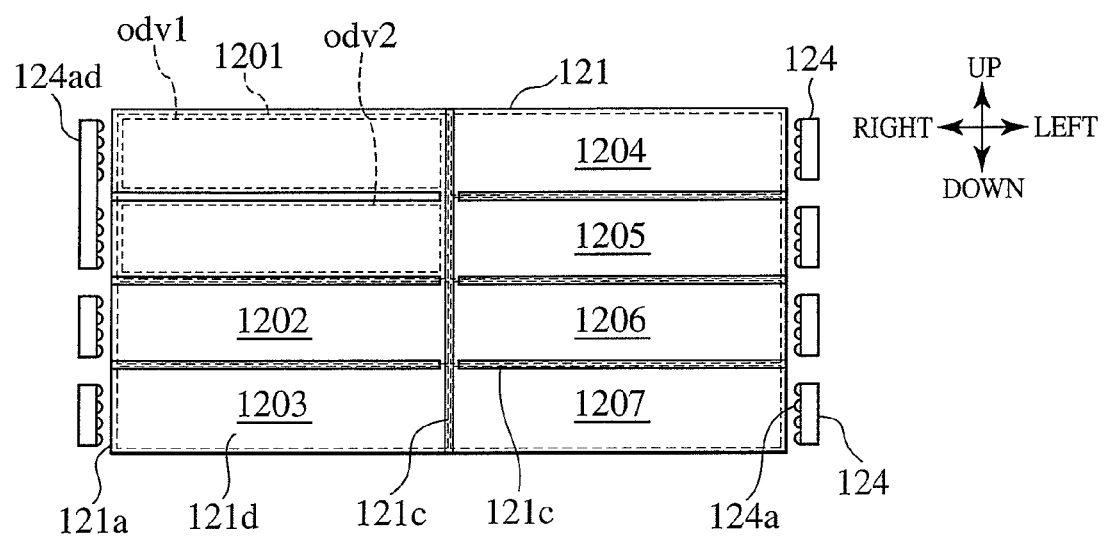

Another division method will now be described with reference to FIG. 12B. FIG. 12B indicates that seven regions are formed. The regions are respectively named the first region 1201, the second region 1202, and so on to the seventh region 1207. The first region 1201, which is one of the seven regions, has two times the area of the other regions. The employed light guide plate 121 is identical with that shown in FIG. 12A. As the light source 124ad for the first region 1201 has two times the length of the light sources 124 for the other regions, the first region 1201 has two times the area of the other regions. Although the first region is optically subdivided into upper and lower regions by a concave groove 121c in the first region (these two regions are referred to as optically separated regions odv1 and odv2, respectively), the first region 1201 has two times the area of the other regions because the same light source is used for optically separated regions odv1 and odv2. Further, the LEDs 124a of a light source 124 for a convex section near one end of the incidence plane 121a of the light guide plate 121 may be smaller in number than the LEDs 124a for a convex section near the center.

The incidence plane 121a of the light guide plate 121 is provided with light sources 124 that are positioned for various regions. When viewed from the incidence plane 121a, concave sections and convex sections are formed on the light guide plate 121 by the concave grooves 121c. The light sources 124 are positioned relative to the convex sections formed by the concave grooves 121c. The light sources for illuminating the second to seventh regions correspond to the convex sections on a one-to-one basis. However, the light source 124ad for illuminating the first region corresponds to the convex sections on a one-to-two basis because the convex sections are provided for two optically separated regions within the first region. The light sources do not always correspond to the convex sections on a one-to-one basis as shown in FIG. 12B.

Further, the light guide plate 121 may be such that the convex section near one end of the incidence plane 121a is greater in width than the convex section near the center.

The use of the configuration according to the present invention makes it possible to improve not only the contrast but also the motion picture quality. CRT-based television receivers achieve the highest motion picture quality among various types of television receivers. The reason is that a spot within the display screen illuminates only at the instant at which a write is performed (electron beam irradiation occurs). In other words, the highest motion picture quality is achieved due to the use of a non-hold type display method.

Meanwhile, the liquid crystal display device 1 (see FIG. 1) is inferior to the CRT in motion picture quality because the former continuously illuminates a light source 124 (see FIG. 1) under normal conditions. It is conceivable that the motion picture quality of the liquid crystal display device 1 may be improved by turning off the light source 124 with predetermined timing.

The liquid crystal panel 120 (see FIG. 1) displays a motion picture by periodically (e.g., at intervals of 1/60 second) rewriting the image data to be displayed on the display surface. When one image data to be displayed on the display surface of the liquid crystal panel 120 is called a frame image, the length of time required for rewriting the frame image is referred to as the frame period. If, for instance, the frame image is rewritten at intervals of 1/60 second, the frame period is approximately 1/60 second. Thus, the liquid crystal panel 120 displays a motion picture while rewriting the frame image at 1/60 second intervals.

As such being the case, the present embodiment should extinguish the light source 124 (see FIG. 1) during a predetermined period within the frame period. In other words, the frame period includes an extinguishment period.

The interval between one extinguishment period for extinguishing the light source 124 and the next extinguishment period is regarded as one cycle, which is defined here as a backlight period. The backlight period should preferably be equal to the frame period, an integer multiple of the frame period (e.g., two or three times the frame period), or an integer multiple fraction of the frame period (e.g., 1/2 or 1/3 the frame period).

The length of the extinguishment period of each light source 124 may be 20% to 80% of the length of the frame period. In this instance, the length of the remaining frame period is the length of an illumination period for each light source 124. It goes without saying that the extinguishment period may be decreased or increased when dimming is simultaneously provided.

A line-sequential driving method is generally employed for the liquid crystal panel 120 (see FIG. 1) so as to write image data by allowing a scanning line to perform a scan from the uppermost end of the liquid crystal panel 120 to the lowermost end. Therefore, the timing for scanning the uppermost pixel differs from the timing for scanning the lowermost pixel. This timing difference is substantially equal to the frame period. The liquid crystal requires a response time of 5 to 10 ms before the transmission for written image data is reached. Therefore, when a light source 124 (see FIG. 1) is to be extinguished and illuminated, the motion picture quality can be improved by illuminating the light source 124 at the instant at which the liquid crystal reaches a desired transmission.

Figure 10:
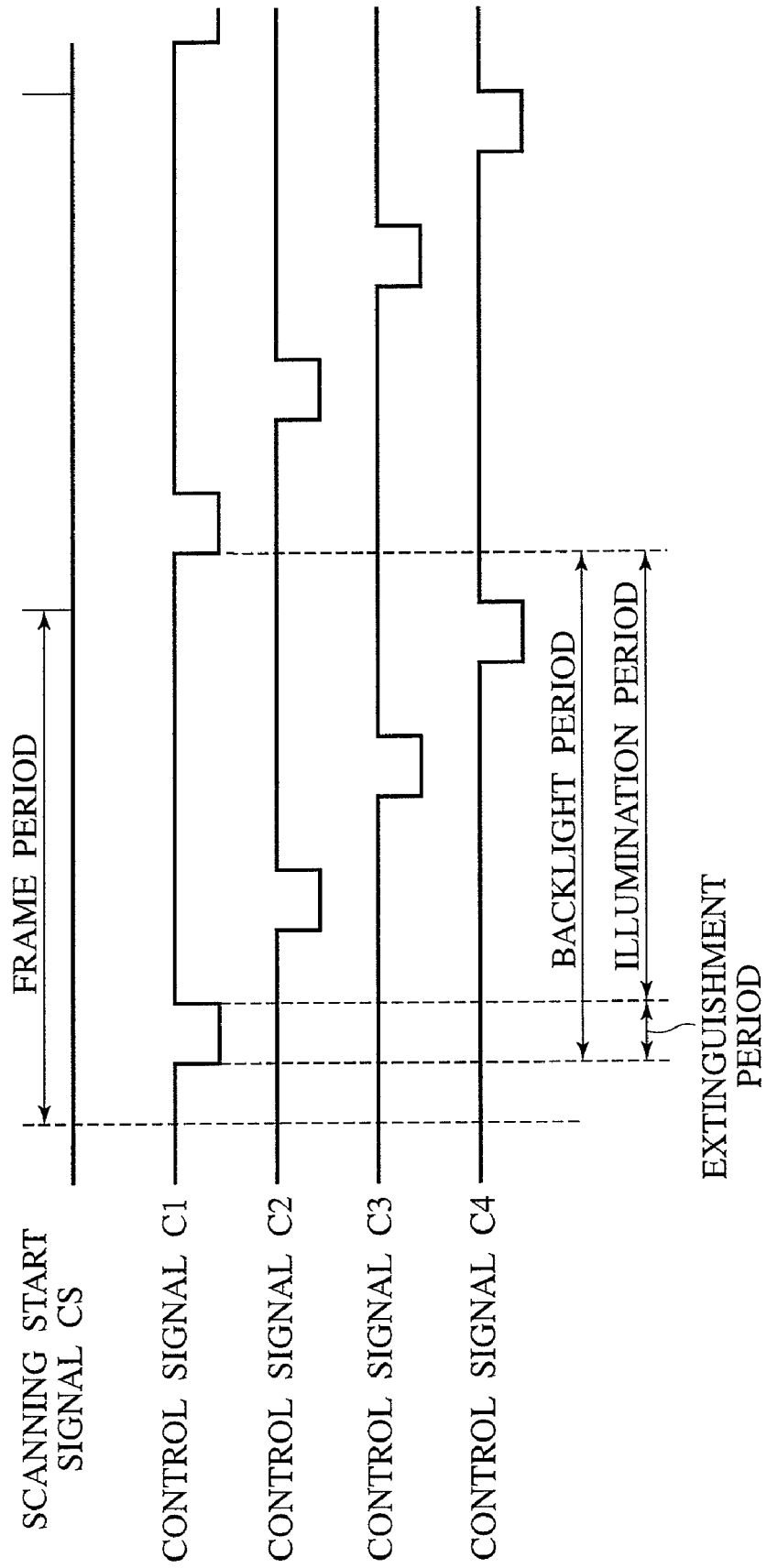
FIG. 10 is a timing diagram illustrating a case where the light sources are driven in order to improve the motion picture quality.

FIG. 9 shows liquid crystal panel regions, which correspond to the rear surface divisions of the light guide plate. FIG. 10 is a timing diagram illustrating a case where the light sources are driven in order to improve the motion picture quality. A scanning start signal CS serves as a trigger for starting a scan of the liquid crystal panel 120 (see FIG. 9). Intervals at which the scanning start signal CS is generated are equivalent to the frame period.

Further, four regions of the liquid crystal panel 120, which correspond to the rear surface divisions 121d of the light guide plate 121, are individually managed as shown in FIG. 9. From top to bottom, the four regions are designated the first region 1201, the second region 1202, the third region 1203, and the fourth region 1204, respectively. The number of regions of the liquid crystal panel 120 may be determined in accordance with the number of rear surface divisions 121d of the light guide plate 121.

Control signals C1-C4 are input to the switches 126c for the light sources 124 corresponding to the four regions shown in FIG. 9 from, for instance, the control device 125a (see FIG. 1). When a control signal (C1, C2, C3, or C4) is ON, the associated light source 124 becomes illuminated. When the control signal (C1, C2, C3, or C4) is OFF, the associated light source 124 becomes extinguished.

In the present embodiment, the first region 1201 (see FIG. 9) enters an extinguishment period 1 to 2 ms after the scanning start signal CS, for example, turns ON as shown in FIG. 10. More specifically, the control device 125a (see FIG. 1), for example, turns off control signal C1 to extinguish the light source 124 (see FIG. 9) for the first region 1201 and causes the first region 1201 to enter the extinguishment period. When a predetermined period of time elapses subsequently, the control device 125a, for example, turns on control signal C1 to illuminate the light source 124 for the first region 1201. Then, the control device 125a, for example, turns off control signal C2 to extinguish the light source 124 for the second region 1202 (see FIG. 9) and causes the second region 1202 to enter the extinguishment period. As described above, the control device 125a, for example, sequentially causes the first region 1201, the second region 1202, the third region 1203 (see FIG. 9), and the fourth region 1204 (see FIG. 9) to enter the extinguishment period.

An alternative configuration may be employed so as to illuminate one light source 124 while at the same time extinguishing the next light source 124. Another alternative configuration may also be employed so as to illuminate one light source 124 and illuminate the next light source 124 after the elapse of a short period of time.

As the extinguishment timing varies from one light source 124 to another as described above, the liquid crystal panel 120, for example, can place a currently rewritten region for frame images in an extinguishment period within a frame period while placing a completely rewritten region for frame images in an illumination period within a frame period. This makes it possible to achieve light source illumination in proper timing with a response from a liquid crystal in each region, thereby improving the motion picture quality of the liquid crystal panel 120.

The present embodiment assumes that the extinguishment timing varies from one region to another. However, the present invention is not limited to the use of such extinguishment timing. When, for instance, the employed configuration is such that ten rear surface divisions 121d are formed by the concave grooves, control contrast may be exercised individually for each of the ten rear surface divisions 121d while exercising motion picture quality improvement control over each combination of two rear surface divisions. In such an instance, some of the light sources for the ten rear surface divisions may become extinguished with the same timing. In other words, at least two of the independently controlled light sources may differ in the timing with which the extinguishment period begins.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A liquid crystal display device comprising:
a liquid crystal panel;
a light guide plate having side surfaces, the side surfaces including non-adjacent opposite side surfaces, the light guide plate being mounted on a rear surface of the liquid crystal panel;
at least one light source positioned with respect to at least one of the non-adjacent opposite side surfaces of the light guide plate so that a light ray therefrom is incident on the light guide plate at an incidence plane formed on the at least one of the non-adjacent opposite side surfaces of the light guide plate; and light source driving means for driving the at least one light source;

wherein the light guide plate guides the light ray incident from the incidence plane, outputs the light ray from an output plane of the light guide plate facing the liquid crystal panel, and illuminates the liquid crystal panel from the rear surface of the liquid crystal panel;

wherein at least one groove is formed on a plane of the light guide plate which extends substantially parallel to the rear surface of the liquid crystal panel, the at least one groove having a depth in a direction from the output plane of the light guide plate to a back surface of the light guide plate which is opposite to the output plane without penetrating one of the output plane and the back surface of the light guide plate the direction of the depth thereof;

wherein the at least one groove extends between the non-adjacent opposite side surfaces of the light guide plate, the at least one groove having an end portion thereof which stops short of the non-adjacent opposite side surfaces without penetrating the non-adjacent opposite side surfaces, at least one of the non-adjacent opposite side surfaces having the at least one light source positioned with respect thereto;

wherein the plane on which the at least one groove is formed has an indented portion and raised portions, the raised portions being higher than the indented portion, the indented portion being interposed between the raised portions, the raised portions extending to reach a part of the peripheries of the plane at both of the non-adjacent opposite side surfaces;

wherein the at least one groove extends in a direction perpendicular to the non-adjacent opposite side surfaces.

2. The liquid crystal display device according to claim 1, wherein the at least one groove forms a concave section and a convex section at one end of the incidence plane; wherein the at least one light source includes light sources positioned relative to the convex section formed at one end of the incidence plane; and wherein the light source driving means individually controls the light sources positioned relative to the convex section.

3. The liquid crystal display device according to claim 2, wherein the liquid crystal panel displays videos by periodically rewriting the image data to be displayed; wherein the at least one light source becomes extinguished during a extinguishment period, which a part of a frame period that is required to rewrite one image data displayed on the display surface of the liquid crystal panel; and wherein the timing with which the extinguishment period begins varies from one individually-controlled light source to another.

4. The liquid crystal display device according to claim 2, wherein the liquid crystal panel displays videos by periodically rewriting the image data to be displayed; wherein the at least one light source becomes extinguished during a extinguishment period, which a part of a frame period that is required to rewrite one image data displayed on the display surface of the liquid crystal panel; and wherein the timing with which the extinguishment period begins varies between at least two of the individually-controlled light sources.

5. The liquid crystal display device according to claim 1, wherein the at least one groove extends on the plane from the one of the non-adjacent opposite side surfaces of the incidence plane to about halfway toward the other of the non-adjacent opposite side surfaces.

6. The liquid crystal display device according to claim 1, wherein the at least one groove forms a concave section and a convex section at one end of the incidence plane; wherein the at least one light source is positioned relative to the convex section formed at end of the incidence plane; and wherein the light guide plate is such that the convex section near the one end of the incidence plane is wider than the convex section near the center.

7. The liquid crystal display device according to claim 1, wherein the at least one groove forms a concave section and a convex section at one end of the incidence plane; wherein the at least one light source is composed of a plurality of LEDs and positioned relative to the convex section formed at end of the incidence plane; and wherein the light source LEDs for a convex section near the one end of the incidence plane of the light guide plate are smaller in number than the light source LEDs for a convex section near the center.

8. The liquid crystal display device according to claim 1, further comprising:

a rear cover mounted with respect to a rear surface of the light guide plate; and a heatsink positioned between the liquid guide plate and the rear cover;

wherein heat generated by the at least one light source is transferred to the heatsink, and the rear cover is mounted so as to be spaced from the rear surface of the light guide plate and to delimit a space therebetween.

9. The liquid crystal display device according to claim 8, wherein the heatsink is L-shaped when viewed from above, and wherein a bent portion of the heatsink is positioned between the light guide plate and the rear cover.

10. The liquid crystal display device according to claim 8, wherein the rear cover has an air inlet and an air outlet.

11. The liquid crystal display device according to claim 1, wherein the light guide plate is divided in a plurality of optically separated regions by the at least one groove, and a same light source of the at least one light source is utilized for at least two optically separated regions of the plurality of optically separated regions of the light guide plate.

12. The liquid crystal display device according to claim 1, wherein the light guide plate is divided in a plurality of optically separated regions by the at least one groove, and the at least one light source corresponding to at least two optically separated regions of the plurality of optically separated regions of the light guide plate are simultaneously driven by the light source driving means.

13. The liquid crystal display device according to claim 1, wherein the plane on which the at least one groove is formed is one of the output plane and the back surface of the light guide plate.

14. The liquid crystal display device according to claim 1, wherein the at least one light source is positioned only with respect to the one of the non-adjacent opposite side surfaces of the light guide plate.

15. The liquid crystal display device according to claim 1, wherein at least one other groove is formed to extend in a direction substantially transverse to the extension direction of the at least one groove at a position adjacent to the other end portion of the at least one groove.

16. The liquid crystal display device according to claim 1, wherein a plurality of the grooves are formed on the plane of the light guide plate;

one of the raised portions being interposed between a pair of the grooves next to each other, the one of the raised portions having a width between the pair of the grooves, the width being greater than a width of each of the grooves.

17. The liquid crystal display device according to claim 1, wherein a plurality of the light sources are positioned with respect to the at least one of the non-adjacent opposite side surfaces of the light guide;
one of the light sources being positioned next to at least two of the raised portions having the at least one groove interposed therebetween to share the light ray emitted from the one of the light sources.

18. The liquid crystal display device according to claim 17, wherein the one of the light sources is equipped with a plurality of LEDs that are simultaneously driven by the light source driving means.

* * * * *